(12) United States Patent
Hudson

(10) Patent No.: US 7,439,875 B2
(45) Date of Patent: Oct. 21, 2008

(54) BATTERY CONSERVATION

(75) Inventor: Steve Martin Hudson, Sturminster Newton (GB)

(73) Assignee: Expro North Sea Limited, Reading, Berkshire (GB)

(*) Notice: Subject to any disclaimer, the term of this patent is extended or adjusted under 35 U.S.C. 154(b) by 435 days.

(21) Appl. No.: 10/529,084

(22) PCT Filed: Oct. 3, 2003

(86) PCT No.: PCT/GB03/04301

§ 371 (c)(1), (2), (4) Date: Mar. 24, 2005

(87) PCT Pub. No.: WO2004/032344

PCT Pub. Date: Apr. 15, 2004

(65) Prior Publication Data

US 2006/0049960 A1   Mar. 9, 2006

(30) Foreign Application Priority Data

Oct. 3, 2002   (GB)   .................. 0222932.6

(51) Int. Cl.
*G01V 3/00*   (2006.01)

(52) U.S. Cl. ............... 340/855.4; 340/855.5; 340/855.7

(58) Field of Classification Search .............. 340/853.1, 340/855.5, 855.7, 855.4, 870.2, 870.23, 870.24
See application file for complete search history.

(56) References Cited

U.S. PATENT DOCUMENTS

| | | | |
|---|---|---|---|
| 3,659,085 A | 4/1972 | Potter et al. | |
| 4,293,936 A | 10/1981 | Cox et al. | |
| 4,513,403 A | 4/1985 | Troy | |
| 5,127,404 A | 7/1992 | Wyborny et al. | |
| 5,148,408 A | 9/1992 | Matthews | |
| 5,689,248 A * | 11/1997 | Esfahani et al. | 340/853.1 |

FOREIGN PATENT DOCUMENTS

| | | |
|---|---|---|
| GB | 2 094 527 | 9/1982 |
| GB | 2 281 424 | 3/1995 |
| WO | WO 93/06578 | 4/1993 |

OTHER PUBLICATIONS

International Search Report for International Application No. PCT/GB2003/004301 completed Jan. 26, 2004.
Standard Search Report for corresponding European Application completed Jul. 2, 2003.

* cited by examiner

*Primary Examiner*—Timothy Edwards, Jr.
(74) *Attorney, Agent, or Firm*—Alston & Bird LLP

(57) ABSTRACT

Methods and apparatus for conserving battery energy used in transmitting signals carrying data from a downhole location, using a transmission system where a predetermined set of data is to be transmitted once during a predetermined period. The method can comprise the steps of: transmitting at least one signal during said period to transmit the set of data; selecting the time of transmission of said at least one signal; and representing at least some of the data to be transmitted in terms of the time of transmission of said at least one signal.

42 Claims, 3 Drawing Sheets

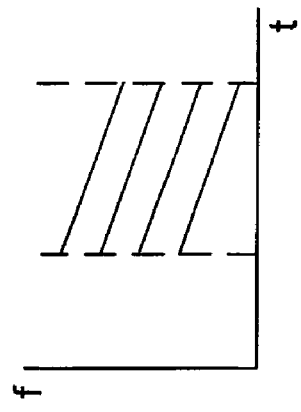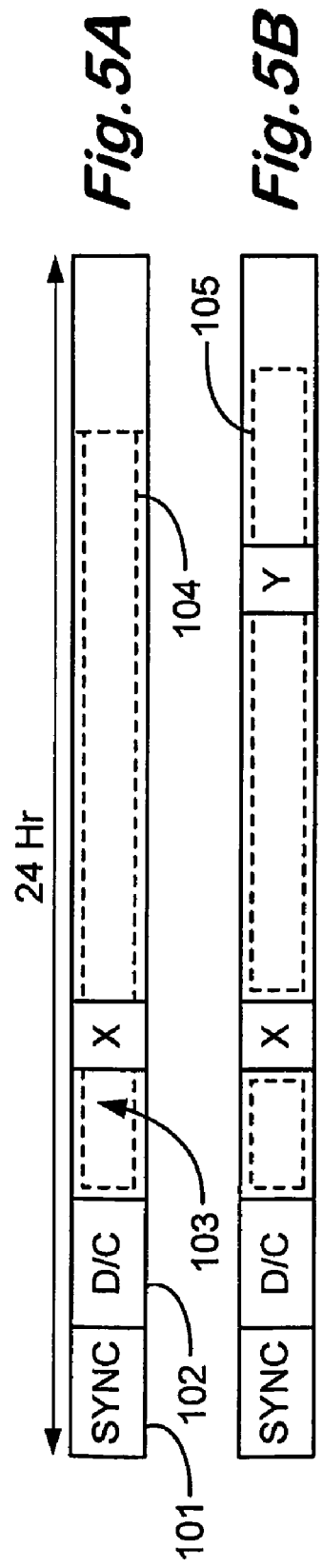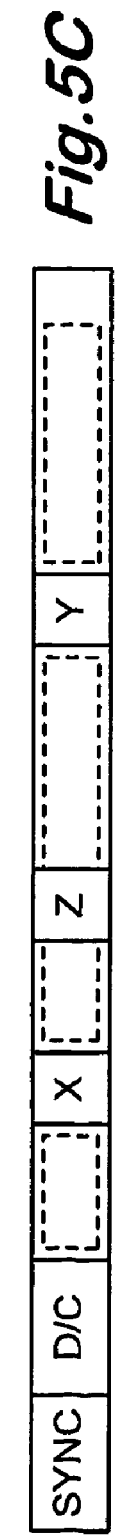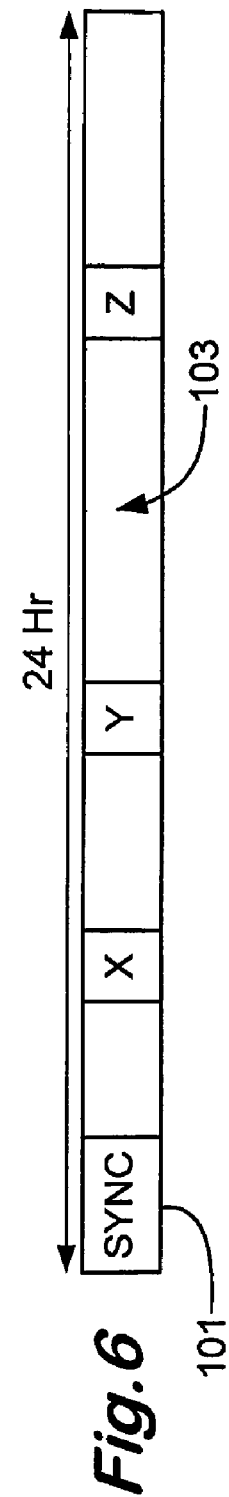

BATTERY CONSERVATION

BACKGROUND OF THE INVENTION

This invention relates to battery conservation in data transmission systems.

In some circumstances the conservation of battery energy in data transmission systems becomes of importance.

A particular area where this is of concern is in the field of pipeline, and particularly downhole communications. In these situations the power demands for transmission can be relatively high compared with the capacity of batteries which can be used. Particularly in downhole circumstances, the types of batteries which can be used and the expense of these batteries is influenced by the environment in which they must survive and operate. These factors lead to it being desirable to conserve battery energy where possible. Furthermore, in the case of some installations, particularly downhole, the replacement of used batteries can be difficult, impossible or not cost effective. In some cases, when the batteries powering a tool have run down, the tool as a whole will have to be replaced.

In other circumstances it will be desired to increase the distance over which signals can be transmitted rather than prolonging battery life. Again, in these circumstances, systems which effectively conserve battery energy are useful since the power used in transmitting any one set of data might be increased to increase range without adversely affecting the life of the battery compared with a less efficient data transmission system.

It is an object of this invention to provide methods, systems and apparatus which conserve battery energy whilst transmitting data.

BRIEF SUMMARY OF THE INVENTION

According to one aspect of the present invention there is provided a method of conserving battery energy used for transmitting signals carrying data in a transmission system where a predetermined set of data is to be transmitted once during a predetermined period, the method comprising the steps of: transmitting at least one signal during said period to transmit the set of data; selecting the time of transmission of said at least one signal; and representing at least some of the data to be transmitted in terms of the time of transmission of said at least one signal.

According to another aspect of the present invention there is provided data transmission apparatus using battery energy for transmitting signals carrying data in a regime where a predetermined set of data is to be transmitted once during a predetermined period, the apparatus comprising: transmitting means arranged for transmitting at least one signal during said period to transmit the set of data, and control means for selecting the time of transmission of said at least one signal and arranged for representing at least some of the data to be transmitted in terms of the time of transmission of said at least one signal.

Using such techniques, the overall time spent actually transmitting signals, in order to transmit the set of data, can be minimised. Hence the amount of battery power used in transmitting the set of data can be minimised. In effect time is being used as a resource.

Typically the transmission system will be such that a set of data is to be transmitted once during each of a plurality of successive predetermined periods, which may be contiguous. For example a set of data may be transmitted once every 24 hours.

In some cases there will be a plurality of sets of data, each of which are to be sent once during the same predetermined period or respective predetermined periods. In such cases signals having different frequency characteristics may be used to carry respective sets of data such that the signals are distinguishable from one another.

In one set of embodiments the method comprises the step of transmitting a first, reference, signal within each predetermined period and transmitting at least one further signal, as a data signal, at a selectable time relative to the reference signal within each predetermined period. In such embodiments the time spacing between the signals can be used to represent data. The reference signal may be sent at a preset time in each period, this may for example be the beginning or end of each period.

In one particular case, where there is one data signal in each predetermined period, the time period between the data signal of one predetermined period and the reference signal of the same period may be considered together with the time period between the data signal of that predetermined period and the reference signal of an adjacent period and a ratio of these two time periods used to give a value representing at least some of the data to be transmitted. Where there are a plurality of data signals in each time period, a plurality of ratios may be used and each of these may be used to encode data.

The reference signals may be made distinguishable from the data signals, for example the duration of the signals themselves may differ.

Typically data will be represented digitally and, for example, the predetermined period may be quantized appropriately such that different timings represent different digital values.

The method may comprise the further steps of:
determining the data size of the predetermined set of data;
determining the transmission characteristics of the channel over which the data is to be transmitted; and
selecting at least one of:
1) the number of signals to send during the predetermined period;
2) the duration of each signal;
3) the power of each signal; and
4) the quantization of the predetermined period, so as to allow transmission of the required data during the predetermined period whilst minimising the battery energy used.

The apparatus, of course, may be arranged to carry out each of the methods defined above.

The apparatus may comprise computer means.

According to another aspect of the present invention there is provided a computer program comprising code portions which when loaded and run on computer means cause the computer means to execute the steps of:
a) obtaining information regarding the data size of a predetermined set of data to be sent over a channel during a predetermined period, which set of data is to be sent using the steps of transmitting at least one signal during said period, selecting the time of transmission of said at least one signal, and representing at least some of the data to be transmitted in terms of the time of transmission of said at least one signal;
b) obtaining information regarding the transmission characteristics of the channel over which the data is to be transmitted; and
c) selecting at least one of:
1) the number of signals to send during the predetermined period;
2) the duration of each signal;
3) the power of each signal; and 4) the quantization of the predetermined period, so as to allow transmission of the required data during the predetermined period whilst minimising the battery energy used.

According to yet another aspect of the present invention there is provided a computer readable data carrier carrying a program as defined above. The data carrier may comprise a signal, or may comprise storage means such as a floppy disc, a hard disc, a CD-Rom or DVD-Rom.

According to a further aspect of the present invention there is provided a computer arranged to carry out a method as defined above.

According to another aspect of the present invention there is provided a communication system comprising transmission apparatus as defined above and receiving apparatus arranged for receiving and decoding the transmitted signals.

A clock may be provided at the transmitting location and a clock may be provided at the receiving location respectively for use in encoding and decoding data. Where a periodic reference signal is transmitted this may be used to calibrate the clocks one against the other. In an example of this, if the reference signals are to be transmitted every 24 hours but the receiving clock sees the signals at 23 hours and 59 minute intervals it can be determined that the transmitter clock is running 1 minute slower in 24 hours than the receiver clock and appropriate adjustments can be made.

The above apparatus, systems and methods are particularly appropriate for use in pipeline and especially downhole communication. In such situations battery life can be low with usual transmission techniques. Further the batteries used can be expensive and difficult or impossible to replace. Moreover the amount of data to be transmitted can be relatively low and the frequency with which data needs to be transmitted can be low, for example, once a day or even less frequently. In such cases, with more normal transmission techniques no use is made of the transmission channel for the vast majority of the time. In the present techniques maximum use of the available channel time is made by allowing the time of signalling itself to carry data.

It is in the case of downhole communication that some of the biggest benefits can be seen. The methods may be downhole battery conservation methods and the apparatus may be downhole data transmission apparatus.

In one set of embodiments, the method and apparatus may be such that: a plurality of data signals are transmitted during said predetermined period; each data signal has an associated frame within said predetermined period and during which the respective data signal may be sent, the time of transmission of the data signal within that frame representing at least some of the data to be transmitted; and the respective associated frame of at least one of the data signals overlaps in time, at least in part, with the respective associated frame of another of the data signals.

The frames may be such that the respective frame associated with each data signal overlaps in time, at least in part, with the respective associated frames of each of the other data signals.

Each frame may be divided into a plurality of equal length time slots. In some cases each frame may comprise the same number of equal length time slots, with the time slots in each frame being of the same length.

The predetermined period may comprise a data signal period which can be occupied by frames of data signals. This data signal period can be divided into equal length time slots, which are of equal length to the time slots in the frames. In some embodiments the number of equal length time slots in the data signal period equals the sum of the number of data signals to be sent during the predetermined period and the number of equal length timeslots in each frame.

Some frames may be discontinuous in time. A frame may comprise a first plurality of time slots separated from a second plurality of timeslots by an occupied timeslot of another frame.

The method may comprise the step of transmitting a reference signal within the predetermined period, this may be transmitted before the data signal period. The apparatus may be arranged to transmit a reference signal.

The method may comprise the steps of:
splitting the set of data to be sent into data subsets;
transmitting a respective data signal at a selected time within a respective frame in representation of each data subset, wherein the respective frames overlap such that the order of sending of the signals does not provide a positive indication of the data subset to which each signal relates; and
transmitting an auxiliary indicator which enables determination of the data subset to which each signal relates.

The step of transmitting an auxiliary indicator may comprise the step of transmitting the respective data signals at different frequencies.

The step of transmitting an auxiliary indicator may comprise the step of transmitting at least one decommutation signal which indicates the order in which the signals relating to the data subsets are being sent.

The transmission apparatus may be arranged to carry out any of the above steps.

There may be a common frame within the predetermined period associated with a plurality of data signals and within which the plurality of data signals are distributed in time. In some cases there may be a single common frame within the predetermined period. In either case, the pattern of the distribution of the data signals in time within the frame can determine at least some of the data which is to be transmitted.

Preferably where there is a single common frame this frame substantially fills the whole predetermined period. A reference signal may be sent within the predetermined period and outside of the frame but such a reference signal will typically be short compared with the predetermined period such that the frame still substantially fills the whole predetermined period.

A look up table may be used in encoding and/or decoding the data to be sent. Thus transmission apparatus and/or receiving apparatus may comprise storage means carrying a look up table.

The look up table may comprise entries in a form where specific data sets which can be transmitted are associated with unique signal arrangements. Each signal arrangement may be selected to be transmittable during a respective frame. At least part of each unique signal arrangement may comprise a specified distribution of signals in time within the frame. There may be other aspects to each unique signal arrangement, for example, there may be a scheme where a plurality of signal frequencies may be used. The different frequencies may be selectable for each frame or for each signal within a frame such that unique signal arrangements may be distinguished by the frequency of the signals or by the frequency of each of the signals.

The look up table may be populated in a way such that where X specific data sets are to be represented the X unique signal arrangements are chosen such that each includes the minimum number of individual signal pulses. This helps to minimize the energy used in transmitting the necessary data.

The method for conserving battery energy may be arranged to conserve battery energy used by a downhole device in sending data items from a set of predetermined data items during a predetermined period, and the signalling regime may comprise a modulation scheme where a data transmission period is divided into equal length time slots and there is a plurality of unique signal arrangements, each of which arrangements is associated with a respective one of the data items and wherein each unique signal arrangement has an associated pattern of pulses distributed in the time slots and the unique signal arrangements are selected so as to one of control and minimize, across the whole group of associated pulses, the mean number of pulses per associated pattern of pulses.

According to another aspect of the present invention there is provided a method of generating a modulation scheme to conserve battery energy used by a downhole device in sending data items from a set of predetermined data items during a predetermined period, the method comprising the steps of: selecting a data transmission period within the predetermined period and dividing the data transmission period into equal length time slots; and selecting a plurality of unique signal arrangements and associating each signal arrangement with a respective one of the predetermined data items; wherein each unique signal arrangement has an associated pattern of pulses distributed in the time slots and the unique signal arrangements are selected so as to one of control and minimize, across the whole group of associated pulses, the mean number of pulses per associated pattern of pulses.

The method may comprise the further step of determining the shortest pulse period supported by the transmission channel to achieve the required signal to noise ratio. The time slots may be chosen to have a length substantially equal to the determined shortest pulse period.

The data transmission period may be chosen to occupy substantially the whole of the predetermined period.

BRIEF DESCRIPTION OF THE SEVERAL VIEWS OF THE DRAWINGS

Embodiments of the present invention will now be described by way of example only with reference to the accompanying drawings in which:

FIG. 4 illustrates the frequency characteristics over time of a set of signals which may be used in the data transmission system shown in FIG. 1;

FIGS. 5A, 5B and 5C illustrate another alternative signalling regime;

FIG. 6 illustrates a further alternative signalling regime;

DETAILED DESCRIPTION OF THE INVENTION

The present invention is concerned with the conservation of battery energy when using battery power to transmit signals carrying data in a communication system. The energy conservation techniques may be used in a relatively broad set of different data communication systems. However, as mentioned in the introduction above, battery conservation is of particular interest in pipeline transmission systems and all the more so in downhole data transmission systems.

Figure 1:
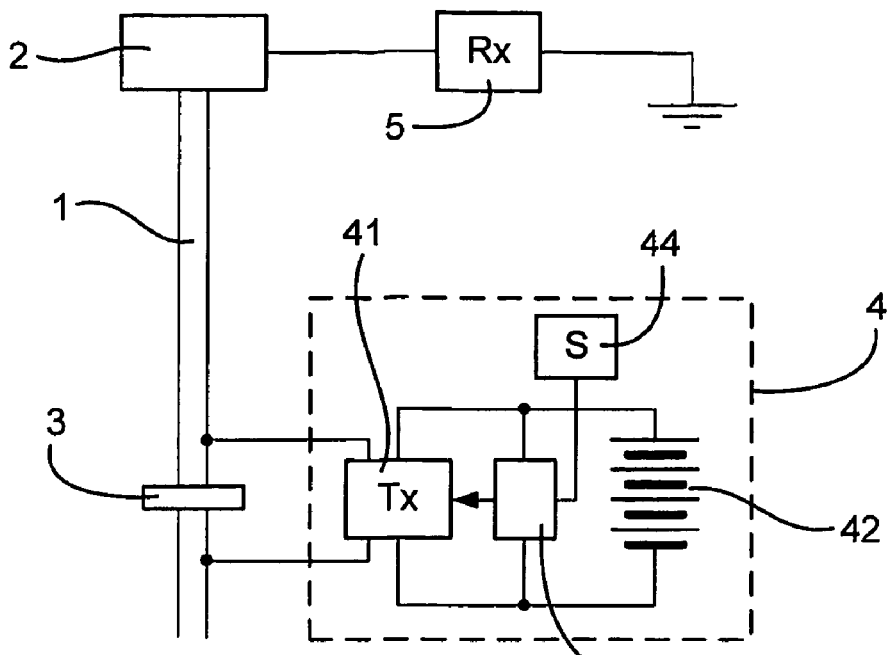
FIG. 1 schematically shows a downhole data communication system which can be operated in a battery conserving manner.

FIG. 1 schematically shows one such downhole data transmission system which can be operated in such a way as to conserve battery energy as will be explained below.

In the downhole data transmission system shown in FIG. 1, data is transmitted from a downhole location to the surface via the metallic structure of the well. This general type of data transmission system is currently used by the applicants and is described in detail in previous patent applications belonging to the applicants.

The metallic structure of the well includes a production string 1 which runs from a wellhead 2 at the surface into the well and is used for extracting oil and/or gas from the well. At a location downhole, an isolation joint 3 is provided in the production string 1. This isolation joint 3 serves to electrically isolate an end portion of the production string 1 from the remainder. A downhole transmitting unit 4 is situated in the region of the isolation joint 3 and a transmitter 41 of the downhole unit 4 is connected across the isolation joint 3. The downhole unit 4 also comprises a battery pack 42, a control means 43 and a set of sensors 44. The battery pack 42 supplies power to the transmitter 41 as well as the other components.

At the surface, receiving means 5 are provided and have one terminal connected to the wellhead 2 and another connected to ground.

When signals are to be transmitted from the downhole location to the surface, the transmitter 41 applies signals across the isolation joint 3 and these travel up the production string 1, through the wellhead 2 and can be detected by the receiving means 5.

The set of sensors 44 are used to sense parameters associated with the well. These for example might be pressure and temperature. The output of the sensors 44 are connected to the control means 43.

Under the control of the control means 43, the downhole unit 4 is used to send details concerning the parameters measured by the sensors 44 on a regular basis to the surface receiving means 5.

Although not shown in FIG. 1, there may be further control means, implemented for example by a computer at the surface, which serves to provide further control functions for the system. Where necessary it is possible for a surface control system to carry out processing concerning the signals to be sent and transmit instructions to the downhole control means 43 such that the transmitter 41 is controlled appropriately. Thus again, although not shown in FIG. 1, transmission means may be provided at the surface and receiver means may be provided in the downhole unit 4 to allow the sending of such signals.

In the present system the data to be sent to the surface is encoded using a modulation scheme where time is used as a resource. In particular the timing of signals sent to the surface represents the data itself. Thus the actual signals sent to the surface need not be modulated in any other way than the time at which they are transmitted.

Figure 2:
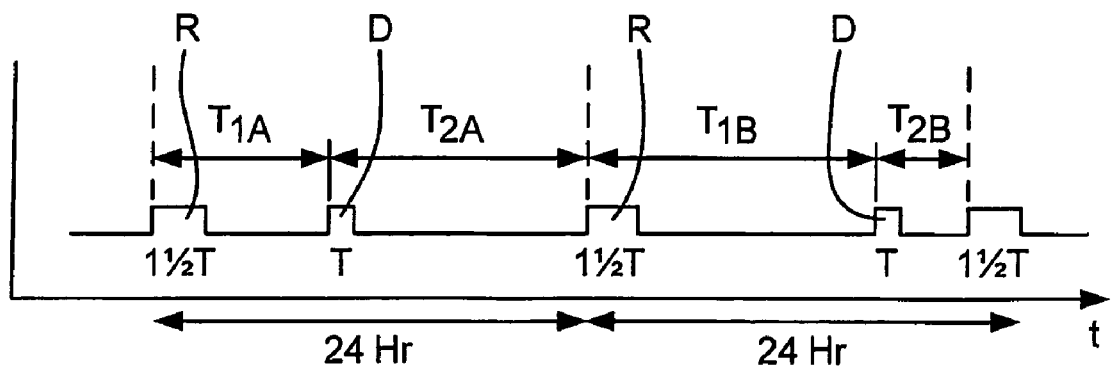
FIG. 2 schematically shows a timing chart for signals sent in the communication system of FIG. 1.

A timing chart showing the modulation scheme used in the present embodiment is shown in FIG. 2. In this case data is scheduled to be sent once a day, that is to say once every 24 hours.

This 24 hour period serves as a predetermined period during which the desired data has to be sent. A reference pulse R is sent at the start of each 24 hour period as shown in the timing chart. Within the remainder of the 24 hour period, a further pulse D, which acts as a data pulse, is sent at a time determined by the control means 43. The time at which this data pulse D is sent is chosen to represent the data which is to be sent.

In effect, the whole of the 24 hour period is quantised, that is split up into time slots each of which is associated with a different digital value. The time at which the data pulse D is sent is chosen so as to give the correct digital value.

As can be seen in FIG. 2, in the first 24 hour time period, the leading edge of the data pulse D is spaced from the leading edge of the preceding reference pulse R by a time $T_{1A}$ and is spaced from the leading edge of the subsequent reference pulse R by a time period $T_{2A}$. In the present embodiment the digital value which is transmitted in the first time period is the ratio $T_{1A}/T_{2A}$.

FIG. 2 also shows the subsequent 24 hour period in which again there is a data pulse D. The value which that pulse represents is given by $T_{1B}/T_{2B}$.

The pulse signals themselves can be simple sine waves of a chosen duration but may be chirps where the frequency of the pulse decreases over the duration of the pulse. Chirps may in some cases assist in determining the timing of the pulse during detection.

The duration of the pulses themselves are selected to give an adequate signal to noise ratio whilst minimising battery usage. Clearly to keep battery usage to a minimum the pulses should be as short as possible and of the lowest power possible. It is envisaged that in a downhole transmission system of the type shown in FIG. 1 the reference pulses R may be three minutes in duration and the data pulses D may be two minutes in duration.

It will be noted that the reference pulses are of a different duration than the data pulses. In the regime illustrated in FIG. 1 the reference pulses R are longer, having the period of 1½T, than the data pulses D having a period of T.

As T is increased the pulses will become easier to detect at the receiving means 5. The longer the pulse, the deeper into noise that pulses can be detected. It has been found by the applicants that with T at two minutes the reference and data pulses can be detected where the signal to noise ratio is −9 dB's. This compares very favourably with a more normal modulation technique which has previously been used where the data is sent using phaseshift keying (PSK) and a signal to noise ratio of 6 to 9 dB is the worst that could be tolerated. Moreover the total signalling time, i.e. the time which the transmitter is operating, to send a desired set of data has been reduced from 10 minutes with PSK signalling to 6 minutes with the current technique.

Because of the characteristics of the transmission channel as a whole there is a limit as to how short the pulses can be and how accurately their timing can be resolved. This effectively places a limit on the amount of data which can be transmitted during a 24 hour period when relying on the timing of the data pulse D to convey all of this data.

However, the amount of data which can be transmitted using the timing of pulses to encode the data can be improved by transmitting more than one data pulse during the predetermined period.

Figure 3:
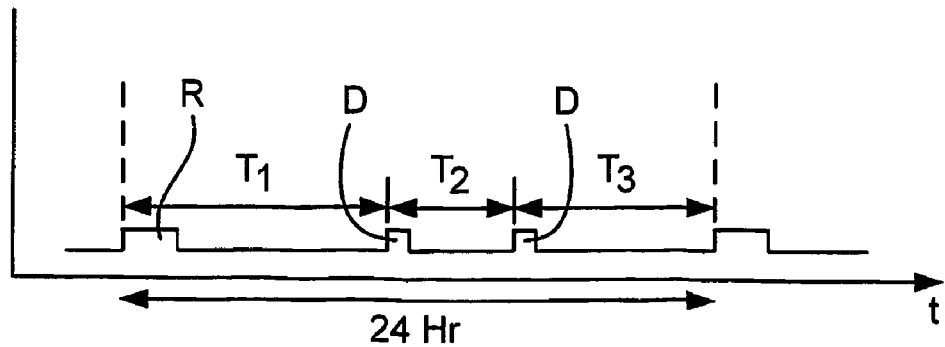
FIG. 3 shows a timing chart for an alternative signalling regime.

FIG. 3 illustrates a timing chart for a system where two data pulses D are transmitted during the predetermined 24 hour period. Here two digital values can be considered by taking the ratios $T_1/T_2$ and $T_1/T_3$.

It has been found by the applicants that in a practical downhole system 40 bits of data can be transmitted during a 24 hour predetermined period if two data pulses D of two minute length are used.

In this practical system the timing of the pulses was determined using a matching technique where the incoming signal was correlated with a model expected signal.

In some situations there may be more than one downhole unit 4 which needs to transmit information along the same piece of metallic structure, or indeed in more general terms, there may be more than one set of data that needs to be transmitted along a single communication channel during any one predetermined period. This can be facilitated by associating a different frequency range of signals to each set of data, for example, to each downhole unit 4.

FIG. 4 illustrates how different frequency range chirps might be allocated. In FIG. 4, four different chirps are shown each of which decreases in frequency over time but each of which starts at a different frequency. Using a correlation technique of the type mentioned above it is possible to distinguish between such signals.

The control means 43 includes a clock which is used for generating the pulses at the correct time intervals. Similarly at the receiving unit 5 there is a corresponding clock which is used in the timing of the received signals in order to extract the desired data. It will be noted that since reference pulses R are transmitted in the present system once every 24 hours it is possible for the clocks to cross calibrate with one another. The clock of the downhole control means 43 transmits reference pulses at what it considers to be precisely 24 hour intervals. These will be detected at the receiving means 5 and where according to the receiving means 5 clock, the intervals are not precisely 24 hours the discrepancy can be detected and corrected for.

In a simple implementation a preset number of pulses, a preset length of pulses and a preset power of pulses can be used, as well as a preset quantisation of the predetermined time period. In more sophisticated systems the above parameters can be chosen so as to optimise the system. In particular, the objective is always to transmit the necessary data whilst using the minimum battery energy. Therefore, if the amount of data which needs to be transmitted is determined as well as the characteristics of the transmission channel available, the parameters above can be selected to meet this objective. In some cases this may be done once only as the system is set up in any particular installation. In yet more sophisticated systems, the parameters may be dynamically chosen by an appropriately programmed computer so as to optimise the system each time that the amount of data to be transmitted varies and/or the quality of the transmission channel varies. As alluded to above a computer for performing these functions may be located at the surface and appropriate instructions sent to the downhole control means so that signals are sent using the correct regime.

The battery conservation methods and apparatus implementing the methods may be used in conjunction with many different physical signalling techniques.

For example, as well as electrical or electromagnetic signalling the same principles and methods may be used in respect of acoustics, for example underwater acoustic signalling. The conservation advantages are given by the modulation technique and are independent of the physical layer of the communication system.

Whilst the modulation schemes of the general type described above can lead to significant battery conservation benefits, there are modulation schemes where even greater benefits may be achieved. These schemes are ones where even more use is made of time as a resource. In general terms such schemes involve the use of several signal pulses within a given time frame, which preferably covers substantially the whole of the predetermined period during which the signals need to be sent. Achieving this and implementing this can be thought of in two broad ways, the first is the idea of overlaying (in the time domain) signals or the frames in which signals are sent within a data transmission period and the second is considering the overall pattern of signals within the data transmission period.

It has also been found by the applicant that sending signals using as short a pulse as the channel can tolerate helps to conserve energy.

The ideal position is to transmit a signal pulse at some point in time to represent the entire data to be sent but this is not always possible. To encode the necessary data in the time available and bearing in mind the minimum detectable pulse length, it can become necessary to transmit two or more pulses. However, the aim is still to minimise the number of pulse that are sent.

To further exemplify these ideas two modulations schemes will be described together with techniques for optimising these. These modulation schemes may be used with the downhole data communication system described above in relation to FIG. 1 and/or modifications thereof.

FIGS. 5A, 5B and 5C schematically show the building up of a series of pulses to be sent over a predetermined period of 24 hours to transmit a desired set of data, in an alternative modulation scheme. In this scheme the predetermined period can be considered split into three main periods. These are a sync period 101 during which a "sync" (or reference) signal is sent, a decommutation period 102 during which a decommutation signal or signals are sent and a data transmission period 103 during which data signals are sent.

The sync period is very short compared with the whole predetermined period. It carries a short pulse signal which serves to indicate that the predetermined period has started and relative to which the timing of the other signals can be measured.

In the case illustrated, three data signal pulses X,Y and Z are transmitted during the predetermined period to encode the data to be transmitted. These signals have been overlayed in a way which is described below.

The data to be transmitted is first split into three data subsets.

The position of a first pulse X is chosen within a respective time frame 104 illustrated in dotted lines in FIG. 5A, to represent the value of the first data subset. The time frame 104 comprises n time slots, such that the value represented by the first pulse X can be between zero and n−1.

The position of a second pulse Y is chosen within a respective time frame 105 illustrated in dotted lines in FIG. 5B, to represent the value of the second data subset. Again this time frame 105 comprises n time slots, so that the position of the second pulse Y can represent a value between zero and n−1. It will be noted that the frame 105 associated with the second pulse Y overlaps almost entirely with the frame 104 associated with the first pulse X. This allows better use to be made of time as a resource.

Further it will be noted that the frame 105 associated with the second pulse Y is discontinuous in time—part precedes the location of the first pulse X and part follows the first pulse X. Moreover so that the frames are of the same length, the second frame 105 finishes one timeslot after the first frame 104.

The position of a third pulse Z is chosen within a respective time frame 106 illustrated in dotted lines in FIG. 5C to represent the value of the third data subset. Again this time frame 106 comprises n time slots, is discontinuous in time and finishes one time slot after the second frame 105.

It will be noted that the third pulse Z which represents the third data subset precedes, in time, the second pulse Y which represents the second data subset. Therefore the order of transmission of the pulses does not indicate to which data subset they relate. This flexibility of ordering is advantageous because it allows the same time period to be used in the encoding of plurality of pieces of data, however, some means is needed to allow the identification of the pulses to allow decoding.

There are different ways in which this may be achieved, for example the pulses might be distinguishable from one another by virtue of frequency or some other intrinsic characteristic. In the present embodiment however, the necessary information to allow identification of the pulses is sent by way of a decommutation signal or signals, alluded to above, during the decommutation period 102. In the present case the decommutation signals carry data indicating the order of the pulses—ie that the first pulse will be received first, then the third pulse and then the second pulse. This allows the receiving station to extract the transmitted data.

This modulation technique has a relatively low processing overhead for transmission and reception which is advantageous in situations were processing power is limited.

In developments of this system, transmitting means capable of transmitting different frequency signals may be used to allow encoding of more data with given pulse arrangements. For example, if it is possible to transmit and distinguish on reception 8 distinct frequencies, as well as the data carried by the position in time of the pulses, a further 3 bits of information may be carried by each pulse by virtue of selecting a particular frequency.

It should be noted that in alternatives to the above embodiment the need for separate sync and decommutation signals (and associated periods) can be avoided. In particular, in some cases, the sync pulse can carry the decommutation information. For example, the frequency of the sync pulse could encode the decommutation data and its length or a gap before it longer than any possible message could indetify the pulse as the sync pulse.

The above modulation scheme may be optimised for communication over a particular channel. Where each set of data has a pre-determined standard length in terms of the number of bits in the set of data (ie each set of data comprises N bits), the following process can be used.

Step 1: By means of channel survey or modelling determine the shortest pulse period "T" required to provide adequate signal to noise ratio. With current equipment and techniques a signal to noise ration of the order of 9 dB's is generally appropriate.

Step 2: Calculate the number of times "Q" that the period T fits within the predetermined period (or alternatively an estimate of the likely data transmission period 103 allowing for the sync period 101 and decommutation period 102). From this determine the largest value of "n" where $2^n$ is less than or equal to Q. This value of n indicates the number of bits that may be encoded using the delay between the sync pulse and the first data pulse.

Step 3: From the channel survey or model determine the number "m" of discrete frequencies that can be supported by the channel whilst achieving the desired minimum signal to noise ratio. $2^m$ discrete frequencies are required to encode m bits of data into each pulse.

In some cases one of the frequencies may be reserved for use as the sync pulse. In other cases a longer pulse may be used to identify the sync pulse. The selection of which mechanism is used can be determined to some extent by whether there are "left over" frequencies or time slots. In this sense, if there are nine frequencies available $2^3=8$ may be used to represent 3 bits and the remaining "left over" frequency may be used for the sync pulse.

Step 4: The number of data pulses required "R" can be determined by the relation R=N/(m+n). As well as this there will be at least one standard length pulse as a sync pulse. Furthermore it is necessary to determine the amount of information that is needed to allow the decommutation of the data pulses. This is dependent on the number of ways in which the data pulses may be ordered which is given by R!. The number of bits "n1" needed to send this information is determined by finding the value of n1 such that $2^{n1}$ is greater or equal to R!. The decommutation data may be sent by way of a pulse or pulses appropriately positioned after the sync pulse and before the data pulses or by some other means.

FIG. 6 shows a series of pulses which are to be sent using another alternative modulation scheme. Here again three data pulses X, Y and Z are being transmitted during a 24 hour predetermined period. The predetermined period in this case is split into two main periods. The first is a sync period 101 and the second is a data transmission period 102. Similarly to the scheme described above in relation to FIGS. 5A, 5B and 5C, the sync period 101 is short compared with the predetermined period and is used to transmit a reference pulse.

In this case there is a single common frame which is associated with each of the data pulses X, Y and Z and which substantially fills the whole of the data transmission period 102.

Here the order of the data pulses X, Y and Z is not significant in itself. What is important is the overall pattern of pulses following the sync signal. The scheme works by building up a table of unique signal arrangements and associating each signal arrangement with a specific data set which may need to be sent. It should be noted that specifying unique signal arrangement need not consist solely of specifying a particular pattern of pulses to be transmitted. There may be other elements that lend uniqueness, in particular, the pulses or each pulse may be transmittable at one of a selected set of frequencies to thereby encode more data. Thus entries in the table may include information regarding the frequency of the pulses or each pulse.

The building of such a table relies on knowing various characteristics of the data sets that can be sent within the system. For example if it is known that each data set will include N bits, then the table can be set up to have an entry for every possible value that N bits can take. Similarly if it is known that only a predetermined set of values can be generated and will require transmission, entries can be made in the table for each of those values.

In carrying out this scheme when communicating data, the tables may be implemented as "look-up tables" which are accessible to control means in the transmission and reception apparatus. The look-up tables may be carried in data storage means.

Figures 7, 8:
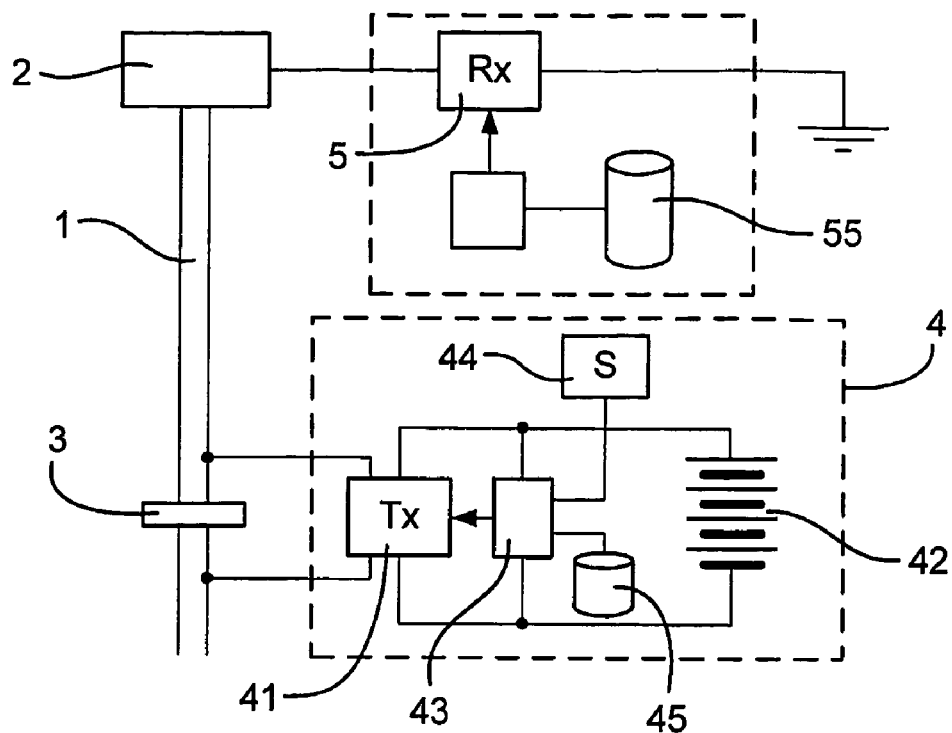
FIG. 7 shows a modified version of the downhole data communication system of FIG. 1.
FIG. 8 shows an example look up table.

FIG. 7 shows a modified version of the data communication system shown in FIG. 1 which has the same elements as that system but further comprises a downhole data storage means 45 carrying a look-up table that is accessible to the downhole control means 43, as well as a surface data storage means 55 carrying a look-up table that is accessible to a surface control means 53. The look-up tables may be used respectively in transmitting and receiving data. As will be clear, there may also be a transmitter located at the surface and a receiver located downhole and in such a case the look-up tables may be used in transmission and reception at each end of the transmission channel.

In order to minimize the energy used to transmit data, when building look-up tables, the general principle of minimizing the number of pulses to be sent is observed. In this way the look-up table will be populated so that those patterns that use the smallest number of pulses are used first (ie first associated with a necessary data set).

The above modulation scheme may be optimised for communication over a particular channel. Where a set of data is to be sent once during each predetermined period of length "P", each set of data has a predetermined standard length in terms of the number of bits in the set of data (ie each set of data comprise "N" bits), and only one transmission frequency is available the following process can be used to find the optimum modulation scheme.

Step 1: By means of channel survey or modelling determine the shortest pulse period "T" required to provide adequate signal to noise ratio. With current equipment and techniques a signal to noise ratio of the order of 9 dB's is generally appropriate.

Step 2: Calculate the number of available time slots "n" available between sync pulses using:
 i) the equation n=INT[(P/T)−1] where a single pulse is used a the sync pulse or
 ii) the equation n=INT[(P/2T)−1] where a gap longer than any possible message is used to define the sync.

Note that the function INT[x] gives the integer part of a value "x".

Step 3: It will be recognised that to uniquely represent each value that may be represented by N bits it is necessary to have $2^N$ unique pulse arrangements.

The relation n!/(R!(n-R)!) gives the number of unique pulse arrangements which can be achieved in n slots using R pulses.

Starting with R=0, use this relation to calculate the number of unique pulse arrangements for increasing values of R until the sum of these unique arrangements equals or exceeds $2^N$. This largest value of R represents the maximum number of pulses needed to encode all of the different values that N bits can represent.

For example if n=4 and N=3, $2^3$=8 values need to be represented and this require the largest value of R to be 2. This is because R=0 gives 1 pulse arrangement, R=1 gives 4 pulse arrangements and R=2 gives 6 pulse arrangements—yielding an aggregate of 11 possible arrangements.

Step 4: Populate a look up table with unique signal arrangements associating each with one of the values that N bits can represent. Start this process with those signal arrangements which use the minimum number of pulses so that the average (mean) number of pulses used per signal arrangement in the group as a whole is minimised.

Thus in the example above all of the R=0 and R=1 arrangements would be used but only three of the R=2 arrangements. FIG. 8 shows an example look up table for the case where n=4 and N=3, ie there are 4 time slots available and three bits of data a, b and c are to be transmitted. In FIG. 8 a dash represents an empty time slot and a tick represents a pulse.

It might also be noted that step 3 need not in fact be carried out in building appropriate look up table, in some implementations. That is to say there is no need to first determine the maximum number of pulses that will be needed to represent the required data. Once the number of available slots is known, an appropriate look up table may be built merely by first assigning the R=0 arrangement to one possible value that the data to be sent may adopt, then assigning each of the R=1 arrangements to respective values and continuing this process for as long as is necessary with increasing values of R until each of the possible data values have been represented.

This process may be implemented by computer program such that an appropriate look up table is generated automatically once the number of time slots available is known and the different possible data values are known.

In a development different frequency signals may be used to allow encoding of more data. In such a case the look up table would be built by first using the R=0 arrangement and then using each R=1 arrangement with each different frequency before moving onto the R=2 arrangements and so on. The use of different frequencies m increases the number of possible unique signal arrangements for any given number of pulses R by a factor of $m^R$. Thus it can be seen that there is a dramatic increase in the amount of data which can be encoded by use of an additional frequency as R gets large.

It should also be noted that if for some reason not all of the patterns of pulses are used, for example R=0 cannot be used or a decision is taken not to use R=0, nearly the full advantage of the present idea can still be gained. In such a sense the mean number of pulses used per signal arrangement may be "controlled" to give advantageous results.

The invention claimed is:

1. A method of conserving battery energy used in transmitting signals carrying data from a downhole location, using a transmission system where a predetermined set of data is to be transmitted once during a predetermined period, the method comprising the steps of:
   transmitting at least one signal during said period to transmit the set of data;
   selecting the time of transmission of said at least one signal;
   representing at least some of the data to be transmitted in terms of the time of transmission of said at least one signal,
   determining the data size of the predetermined set of data;
   determining the transmission characteristics of the channel over which the data is to be transmitted; and
   selecting at least one of:
   1) the number of signals to send during the predetermined period;
   2) the duration of each signal;
   3) the power of each signal; and
   4) the quantization of the predetermined period, so as to allow transmission of the required data during the predetermined period whilst minimising the battery energy used.

2. A method according to claim 1 in which the transmission system is such that a set of data is to be transmitted once during each of a plurality of successive predetermined periods.

3. A method according to claim 2 wherein said predetermined periods are contiguous.

4. A method according to claim 1 in which the data is represented digitally and the predetermined period is quantized appropriately such that different timings represent different digital values.

5. A method according to claim 1 wherein, a plurality of data signals are transmitted during said predetermined period; each data signal has an associated frame within said predetermined period and during which the respective data signal may be sent, the time of transmission of the data signal within that frame representing at least some of the data to be transmitted; and the respective associated frame of at least one of the data signals overlaps in time, at least in part, with the respective associated frame of another of the data signals.

6. A method according to claim 5 in which the frames are such that the respective frame associated with each data signal overlaps in time, at least in part, with the respective associated frames of each of the other data signals.

7. A method according to claim 5 in which the predetermined period comprises a data signal period which can be occupied by frames of data signals, this data signal period is divided into equal length time slots, which are of equal length to time slots in the frames and the number of equal length time slots in the data signal period equals the sum of the number of data signals to be sent during the predetermined period and the number of equal length timeslots in each frame.

8. A method according to claim 5 in which at least one frame is discontinuous in time.

9. A method according to claim 5 comprising the further steps of:
   splitting the set of data to be sent into data subsets;
   transmitting a respective data signal at a selected time within a respective frame in representation of each data subset, wherein the respective frames overlap such that the order of sending of the signals does not provide a positive indication of the data subset to which each signal relates; and
   transmitting an auxiliary indicator which enables determination of the data subset to which each signal relates.

10. A method according to claim 9 in which the step of transmitting an auxiliary indicator comprises the step of transmitting at least one decommutation signal which indicates the order in which the signals relating to the data subsets are being sent.

11. A method according to claim 5 in which there is a common frame within the predetermined period associated with a plurality of data signals and within which the plurality of data signals are distributed in time.

12. A method according to claim 1 in which there is a common frame within the predetermined period associated with a plurality of data signals and within which the plurality of data signals are distributed in time.

13. A method according to claim 12 where there is a single common frame which substantially fills the whole predetermined period.

14. Downhole data transmission apparatus using battery energy for transmitting signals carrying data in a regime where a predetermined set of data is to be transmitted once during a predetermined period, the apparatus being arranged to conserve battery energy and comprising:
   a transmitter arranged for transmitting at least one signal during said period to transmit the set of data,
   a controller for selecting the time of transmission of said at least one signal and arranged for representing at least some of the data to be transmitted in terms of the time of transmission of said at least one signal, and
   a computer arranged under the control of software to carry out the steps of:
   a) obtaining information regarding the data size of a predetermined set of data to be sent over a channel during a predetermined period, which set of data is to be sent using the steps of transmitting at least one signal during said period, selecting the time of transmission of said at least one signal, and representing at least some of the data to be transmitted in terms of the time of transmission of said at least one signal;
   b) obtaining information regarding the transmission characteristics of the channel over which the data is to be transmitted; and
   c) selecting at least one of:
   1) the number of signals to send during the predetermined period;
   2) the duration of each signal;
   3) the power of each signal; and 4) the quantization of the predetermined period, so as to allow transmission of the required data during the predetermined period whilst minimising the battery energy used.

15. Apparatus according to claim 14 which is arranged to transmit a set of data once during each of a plurality of successive predetermined periods.

16. Apparatus according to claim 15 in which said predetermined periods are contiguous.

17. Apparatus according to claim 14 arranged to transmit a plurality of data signals during said predetermined period, wherein each data signal has an associated frame within said predetermined period and during which the respective data signal may be sent, the time of transmission of the data signal within that frame representing at least some of the data to be transmitted; and the respective associated frame of at least one of the data signals overlaps in time, at least in part, with the respective associated frame of another of the data signals.

18. Apparatus according to claim 17 in which the frames are such that the respective frame associated with each data signal overlaps in time, at least in part, with the respective associated frames of each of the other data signals.

19. Apparatus according to claim 17 in which the predetermined period comprises a data signal period which can be occupied by frames of data signals, this data signal period is divided into equal length time slots, which are of equal length to the time slots in the frames and the number of equal length time slots in the data signal period equals the sum of the number of data signals to be sent during the predetermined period and the number of equal length timeslots in each frame.

20. Apparatus according to claim 17 in which at least one frame is discontinuous in time.

21. Apparatus according to claim 17 in which the apparatus is arranged to:
split the set of data to be sent into data subsets;
transmit a respective data signal at a selected time within a respective frame in representation of each data subset, wherein the respective frames overlap such that the order of sending of the signals does not provide a positive indication of the data subset to which each signal relates; and
transmit an auxiliary indicator which enables determination of the data subset to which each signal relates.

22. Apparatus according to claim 21 in which the auxiliary indicator comprises at least one decommutation signal which indicates the order in which the signals relating to the data subsets are being sent.

23. Apparatus according to claim 17 in which there is a common frame within the predetermined period associated with a plurality of data signals and within which the plurality of data signals are distributed in time.

24. Apparatus according to claim 23 where there is a single common frame which substantially fills the whole predetermined period.

25. Apparatus according to claim 14 in which there is a common frame within the predetermined period associated with a plurality of data signals and within which the plurality of data signals are distributed in time.

26. Apparatus according to claim 25 where there is a single common frame which substantially fills the whole predetermined period.

27. Apparatus according to claim 14 comprising data storage means carrying a look up table for use in encoding the data to be sent.

28. Apparatus according to claim 27 in which the look up table comprises entries in a form where specific data sets which can be transmitted are associated with unique signal arrangements.

29. Apparatus according to claim 28 in which the look up table is populated in a way such that where X specific data sets are to be represented the X unique signal arrangements are chosen such that each includes the respective minimum possible number of individual signal pulses.

30. A method of conserving battery energy used in transmitting signals carrying data from a downhole location, using a transmission system where a predetermined set of data is to be transmitted once during a predetermined period, the method comprising the steps of:
transmitting at least one signal during said period to transmit the set of data;
selecting the time of transmission of said at least one signal; and
representing at least some of the data to be transmitted in terms of the time of transmission of said at least one signal,
wherein there is a plurality of sets of data, each of which is to be sent once during the same predetermined period, the method comprising the step of using signals having different frequency characteristics to carry respective sets of data such that the signals are distinguishable from one another.

31. A method of conserving battery energy used in transmitting signals carrying data from a downhole location, using a transmission system where a predetermined set of data is to be transmitted once during a predetermined period, the method comprising the steps of:
transmitting at least one signal during said period to transmit the set of data;
selecting the time of transmission of said at least one signal; and
representing at least some of the data to be transmitted in terms of the time of transmission of said at least one signal,
wherein the transmission system is such that a set of data is to be transmitted once during each of a plurality of successive predetermined periods, and the method comprises the steps of transmitting a first, reference, signal within each predetermined period and transmitting at least one further signal, as a data signal, at a selectable time relative to the reference signal within each predetermined period, and
wherein there is one data signal in each predetermined period and the method includes the steps of:
considering the time period between the data signal of one predetermined period and the reference signal of the same period together with the time period between the data signal of that predetermined period and the reference signal of an adjacent period and;
using a ratio of these two time periods to give a value representing at least some of the data to be transmitted.

32. A method of conserving battery energy used in transmitting signals carrying data from a downhole location, using a transmission system where a predetermined set of data is to be transmitted once during a predetermined period, the method comprising the steps of:
transmitting at least one signal during said period to transmit the set of data;
selecting the time of transmission of said at least one signal; and representing at least some of the data to be transmitted in terms of the time of transmission of said at least one signal, wherein the transmission system is such that a set of data is to be transmitted once during each of a plurality of successive predetermined periods, and the method comprises the steps of transmitting a first, reference, signal within each predetermined period and transmitting at least one further signal, as a data signal, at a selectable time relative to the reference signal within each predetermined period, wherein there is one data signal in each predetermined period and the method includes the steps of:

considering the time period between the data signal of one predetermined period and the reference signal of the same period together with the time period between the data signal of that predetermined period and the reference signal of an adjacent period; and using a ratio of these two time periods to give a value representing at least some of the data to be transmitted, and wherein the reference signal is sent at a preset time in each period.

33. A method of conserving battery energy used in transmitting signals carrying data from a downhole location, using a transmission system where a predetermined set of data is to be transmitted once during a predetermined period, the method comprising the steps of:

transmitting at least one signal during said period to transmit the set of data;

selecting the time of transmission of said at least one signal; and representing at least some of the data to be transmitted in terms of the time of transmission of said at least one signal, wherein the transmission system is such that a set of data is to be transmitted once during each of a plurality of successive predetermined periods, and the method comprises the steps of transmitting a first, reference, signal within each predetermined period and transmitting at least one further signal, as a data signal, at a selectable time relative to the reference signal within each predetermined period, wherein there is one data signal in each predetermined period and the method includes the steps of:

considering the time period between the data signal of one predetermined period and the reference signal of the same period together with the time period between the data signal of that predetermined period and the reference signal of an adjacent period and;

using a ratio of these two time periods to give a value representing at least some of the data to be transmitted, and wherein there are a plurality of data signals in each time period, and the method comprises the step of using a plurality of ratios to encode data.

34. A method of conserving battery energy used in transmitting signals carrying data from a downhole location, using a transmission system where a predetermined set of data is to be transmitted once during a predetermined period, the method comprising the steps of:

transmitting at least one signal during said period to transmit the set of data;

selecting the time of transmission of said at least one signal; and representing at least some of the data to be transmitted in terms of the time of transmission of said at least one signal, wherein the transmission system is such that a set of data is to be transmitted once during each of a plurality of successive predetermined periods, and the method comprises the steps of transmitting a first, reference, signal within each predetermined period and transmitting at least one further signal, as a data signal, at a selectable time relative to the reference signal within each predetermined period, wherein there is one data signal in each predetermined period and the method includes the steps of:

considering the time period between the data signal of one predetermined period and the reference signal of the same period together with the time period between the data signal of that predetermined period and the reference signal of an adjacent period and;

using a ratio of these two time periods to give a value representing at least some of the data to be transmitted, and wherein the reference signals are made distinguishable from the data signals.

35. A method of conserving battery energy used in transmitting signals carrying data from a downhole location, using a transmission system where a predetermined set of data is to be transmitted once during a predetermined period, the method comprising the steps of:

transmitting at least one signal during said period to transmit the set of data;

selecting the time of transmission of said at least one signal; and representing at least some of the data to be transmitted in terms of the time of transmission of said at least one signal, wherein a clock is provided at the transmitting location and a clock is provided at the receiving location respectively for use in encoding and decoding data and the method comprises the step of transmitting a periodic reference signal and using this to calibrate the clocks one against the other.

36. A method of conserving battery energy used in transmitting signals carrying data from a downhole location, using a transmission system where a predetermined set of data is to be transmitted once during a predetermined period, the method comprising the steps of:

transmitting at least one signal during said period to transmit the set of data;

selecting the time of transmission of said at least one signal;

representing at least some of the data to be transmitted in terms of the time of transmission of said at least one signal; and using a look up table in encoding the data to be sent, the look up table comprising entries in a form where specific data sets which can be transmitted are associated with unique signal arrangements, wherein the look up table is populated in a way such that where X specific data sets are to be represented the X unique signal arrangements are chosen such that each includes the respective minimum possible number of individual signal pulses.

37. A method of conserving battery energy used in transmitting signals carrying data from a downhole location, using a transmission system where a predetermined set of data is to be transmitted once during a predetermined period, the method comprising the steps of:

transmitting at least one signal during said period to transmit the set of data;

selecting the time of transmission of said at least one signal; and representing at least some of the data to be transmitted in terms of the time of transmission of said at least one signal, wherein the method is used to conserve battery energy used by a downhole device in sending data items from a set of predetermined data items during a predetermined period, with a signalling regime comprising a modulation scheme where a data transmission period is divided into equal length time slots and there is a plurality of unique signal arrangements, each of which arrangements is associated with a respective one of the data items and wherein each unique signal arrangement has an associated pattern of pulses distributed in the time slots and the unique signal arrangements are selected so as to one of control and minimize, across the whole group of associated pulses, the mean number of pulses per associated pattern of pulses;

the method comprising the further step of determining the shortest pulse period supported by the transmission channel to achieve the required signal to noise ratio and defining the time slots so as to have a length substantially equal to the determined shortest pulse period.

38. A method of conserving battery energy used in transmitting signals carrying data from a downhole location, using a transmission system where a predetermined set of data is to be transmitted once during a predetermined period, the method comprising the steps of:

transmitting at least one signal during said period to transmit the set of data;

selecting the time of transmission of said at least one signal; and representing at least some of the data to be transmitted in terms of the time of transmission of said at least one signal, wherein the method is used to conserve battery energy used by a downhole device in sending data items from a set of predetermined data items during a predetermined period, with a signalling regime comprising a modulation scheme where a data transmission period is divided into equal length time slots and there is a plurality of unique signal arrangements, each of which arrangements is associated with a respective one of the data items and wherein each unique signal arrangement has an associated pattern of pulses distributed in the time slots and the unique signal arrangements are selected so as to one of control and minimize, across the whole group of associated pulses, the mean number of pulses per associated pattern of pulses, and wherein the data transmission period is chosen to occupy substantially the whole of the predetermined period.

39. Downhole data transmission apparatus using battery energy for transmitting signals carrying data in a regime where a predetermined set of data is to be transmitted once during a predetermined period, the apparatus being arranged to conserve battery energy and comprising:

a transmitter arranged for transmitting at least one signal during said period to transmit the set of data, and a controller for selecting the time of transmission of said at least one signal and arranged for representing at least some of the data to be transmitted in terms of the time of transmission of said at least one signal, wherein the apparatus is arranged to transmit a plurality of sets of data once during the same predetermined period and to use different frequency characteristics to carry respective sets of data such that the signals are distinguishable from one another.

40. Downhole data transmission apparatus using battery energy for transmitting signals carrying data in a regime where a predetermined set of data is to be transmitted once during a predetermined period, the apparatus being arranged to conserve battery energy and comprising:

a transmitter arranged for transmitting at least one signal during said period to transmit the set of data, and a controller for selecting the time of transmission of said at least one signal and arranged for representing at least some of the data to be transmitted in terms of the time of transmission of said at least one signal, wherein the apparatus is arranged to send data items from a set of predetermined data items during a predetermined period, and is arranged to use a modulation scheme where a data transmission period is divided into equal length time slots and there is a plurality of unique signal arrangements, each of which arrangements is associated with a respective one of the data items and wherein each unique signal arrangement has an associated pattern of pulses distributed in the time slots and the unique signal arrangements are selected so as to one of control and minimize, across the whole group of associated pulses, the mean number of pulses per associated pattern of pulses, and wherein the time slots are defined so as to have a length substantially equal to a shortest pulse period that it has been determined can be supported by the transmission channel.

41. Downhole data transmission apparatus using battery energy for transmitting signals carrying data in a regime where a predetermined set of data is to be transmitted once during a predetermined period, the apparatus being arranged to conserve battery energy and comprising:

a transmitter arranged for transmitting at least one signal during said period to transmit the set of data, and a controller for selecting the time of transmission of said at least one signal and arranged for representing at least some of the data to be transmitted in terms of the time of transmission of said at least one signal, wherein the apparatus is arranged to send data items from a set of predetermined data items during a predetermined period, and is arranged to use a modulation scheme where a data transmission period is divided into equal length time slots and there is a plurality of unique signal arrangements, each of which arrangements is associated with a respective one of the data items and wherein each unique signal arrangement has an associated pattern of pulses distributed in the time slots and the unique signal arrangements are selected so as to one of control and minimize, across the whole group of associated pulses, the mean number of pulses per associated pattern of pulses, and wherein the data transmission period is chosen to occupy substantially the whole of the predetermined period.

42. A computer readable storage medium carrying a program comprising code portions which when loaded and run on computer means cause the computer means to execute the steps of:

a) obtaining information regarding the data size of a predetermined set of data to be sent over a channel during a predetermined period, which set of data is to be sent using the steps of transmitting at least one signal during said period, selecting the time of transmission of said at least one signal, and representing at least some of the data to be transmitted in terms of the time of transmission of said at least one signal;
b) obtaining information regarding the transmission characteristics of the channel over which the data is to be transmitted; and
c) selecting at least one of:
   1) the number of signals to send during the predetermined period;
   2) the duration of each signal;
   3) the power of each signal; and
   4) the quantization of the predetermined period, so as to allow transmission of the required data during the predetermined period whilst minimising the battery energy used.

* * * * *